United States Patent

[11] 3,621,033

| | | |
|---|---|---|
| [72] | Inventor | William J. Houlihan<br>Mountain Lakes, N.J. |
| [21] | Appl. No. | 775,196 |
| [22] | Filed | Nov. 12, 1968 |
| [45] | Patented | Nov. 16, 1971 |
| [73] | Assignee | Sandoz-Wander, Inc.<br>Hanover, N.J. |

[54] 5-HYDROXYAMINO-1,3-DIOXANES
5 Claims, No Drawings

[52] U.S. Cl. .................................................. 260/332.3 H, 260/294.8 R, 260/295 S, 260/296 R, 260/332.2 R, 260/340.7, 424/263, 424/266, 424/275, 424/278, 424/282

[51] Int. Cl. .................................................. C07d 63/12

[50] Field of Search .................................................. 260/295 S, 294.8 R, 296, 332.2 R, 332.3 H

[56] References Cited

OTHER REFERENCES

Aeberli et al., J. Org. Chem., Vol. 32, (10), pp. – 3211–3214, Oct. 1967 QD 241 J,6

*Primary Examiner*—Alan L. Rotman
*Attorneys*—Gerald D. Sharkin, Frederick H. Weinfeldt, Robert S. Honor, Walter F. Jewell and Richard E. Vila

ABSTRACT: This dislosure pertains to 5-hydroxyamino-2,5-disubstituted-1,3-dioxanes, e.g., 5-hydroxyamino-5-methyl-2-phenyl-1,3-dioxane. These compounds are useful as antifungal and antibacterial agents.

5-HYDROXYAMINO-1,3-DIOXANES

This invention relates to novel heterocyclic compounds. In particular this invention pertains to 5-hydroxyamino-2,5-disubstituted-1,3-dioxanes, to acid addition salts thereof, and to methods for their preparation. This invention also relates to intermediates useful in the preparation of said 1,3-dioxanes and to processes for preparing the intermediates.

The compounds of the present invention may be represented by the formula

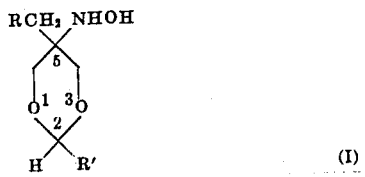

wherein R represents a hydrogen atom, a hydroxyl radical, or a methyl radical

R' represents pyridyl (3- or 4-), thienyl (2- or 3-), furyl (2- or 3-), or a radical of the formula

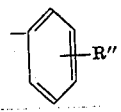

where R'' represents a hydrogen atom, a halo atom having an atomic weight of about 19–36, dihalo where each halo atom has an atomic weight of about 19–36, a lower alkyl radical, i.e., straight or branched alkyl having 1–4 carbon atoms, such as methyl, ethyl, propyl, isopropyl and the like, a 3,4-methylenedioxy radical, or a lower alkoxy radical, i.e., a straight chain alkoxy radical having 1–4 carbon atoms.

These novel compounds of formula (I) may be prepared by treating in solvent a 5-nitro-2,5-disubstituted-1,3 dioxane of the formula

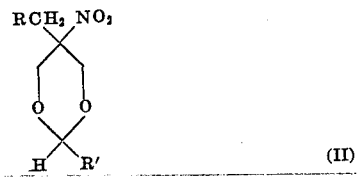

where R and R' are as defined above, with hydrogen in the presence of platinum as catalyst.

According to the above process the compounds illustrated by formula (II) are hydrogenated in solvent at a temperature of about 20° C. to about 45° C., preferably room temperature, and at a pressure of about 50–1500 p.s.i.a. Platinum is used as the hydrogenation catalyst and is essential to the successful operation of the process. Platinum (5 percent) on carbon is conveniently used and is accordingly preferred. Solvents which may be used include alcohols such as lower alkanols, e.g., methanol, ethanol and isopropanol, and mixtures thereof. The resulting product is recovered utilizing conventional recovery techniques such as filtration, concentration, chromatography and the like.

Some of the 5-nitro-1,3-dioxane intermediates (II) utilized in the above process are known and are prepared by treating a 2-nitro-1,3-propanediol (III) with an aldehyde of the formula (IV) according to the following reaction scheme:

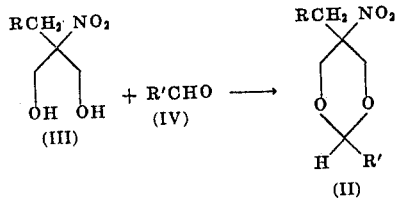

where R and R' are as earlier defined.

The above process for preparing the compounds of formula (II) is conducted by treating in inert solvent, a 2-nitro-1,3-propanediol (III) with the aldehyde (IV) at a temperature of about 100° C. in the presence of p-toluene sulfonic acid.

The starting materials of formulas (III) and (IV) are known and may be prepared according to methods described in the literature.

All of the compounds of structural formulas (I) and (II) exist as optically active isomers. Separation and recovery of the respective stereoisomers may be readily accomplished employing conventional techniques. All the isomers of formula (I) are included within the scope of this invention.

The compounds represented by formula (I) above are useful as antifungal and antibacterial agents as indicated by their activity at concentrations of 10–32 micrograms/ml. in vitro against fungi such as *Histoplasma capsulatum*, *Blastomyces brasiliensis*, *Blastomyces dermatitidis* and bacteria such as the *Tubercle bacillus*, *Mycobacterium tuberculosis*. This is indicated by their activity when tested using a conventional serial dilution test.

When utilized for the aforesaid purposes, the active compounds (I) may be combined with one or more pharmaceutically acceptable carriers or adjuvants. They may be administered orally or locally depending upon the treatment desired. Furthermore, the compounds of formula (I) may be similarly administered in the form of a nontoxic pharmaceutically acceptable acid addition salts. Such salts possess the same order of activity as the free base, are readily prepared by reacting the base with an appropriate acid and accordingly are included within the scope of the invention. Representative of such salts are the mineral acids, such as the hydrochloride, hydrobromide, sulfate, phosphate and the like and the organic acid salts, such as the succinate, benzoate, acetate, p-toluenesulfonate, benzene-sulfonate and the like. Although the exact dosage utilized may vary depending upon the compound employed and the mode of administration, in general, satisfactory results are obtained when these compounds are orally administered for systemic use at a daily dosage of about 3 mg. to about 12 mg. per kilogram of animal body weight. This daily dosage is preferably administered 2 to 4 times a day, or in sustained release form. For most large mammals, the total daily dosage is from about 90 mg. to about 360 mg. Dosage forms suitable for internal use comprise about 22.5 mg. to about 180 mg. of active compound in intimate admixture with a solid or liquid pharmaceutically acceptable carrier or diluent.

A representative formulation suitable for oral administration is a tablet prepared by standard tabletting techniques which contains the following.

| Ingredient | Parts by Weight |
| --- | --- |
| 5-Hydroxyamino-5-methyl-2-phenyl-1,3-dioxane | 30 |
| tragacanth | 2 |
| lactose | 59.5 |
| corn starch | 5 |
| talcum | 3 |
| magnesium stearate | 0.5 |

The following examples are provided for the purpose of illustration and not by way of limitation. They are not intended so as to limit the scope of the invention as defined in the appended claims.

3

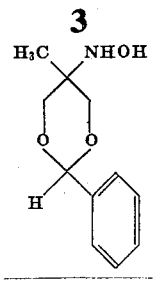

Step 1: 5-methyl-5-nitro-2-phenyl-1,3-dioxane

To a flask equipped with a Dean-Stark tube, condenser and stirrer is added 135 g. (1.0 mole) of 2-methyl-2-nitro-1,3-propanediol, 106 g. of (1.0 mole) benzaldehyde, 5 g. of p-toluenesulfonic acid and 1000 ml. of benzene. The mixture is stirred and refluxed until water fails to separate in the condensate. The solvent is removed in vacuo on a rotary evaporator and the residue is crystallized from methylene chloride-pentane (1:2) to give 5-methyl-5-nitro-2-phenyl-1,3-dioxane; m.p. 116°–118°.

Step 2: 5-hydroxyamino-5-methyl-2-phenyl-1,3-dioxane.

To a glass pressure liner is charged 55.6 g. of 5-methyl-5-nitro-2-phenyl-1,3-dioxane, 5.5 g. of 5 percent platinum on carbon and 550 ml. of isopropanol. The liner is placed in the rocker-arm high pressure autoclave. The system is evacuated and hydrogen is added until the total pressure is 800 p.s.i. The hydrogenation is initiated by activating the rocker. After 23 hours at room temperature ($\approx 25°$), two equivalents of hydrogen are absorbed. The hydrogenation is terminated and the contents of the liner are filtered through celite and the filtrate concentrated in vacuo. The residue is crystallized from isopropanol-carbon tetrachloride (1:1) to give 5-hydroxyamino-5-methyl-2-phenyl-1,3-dioxane; m.p. 157°–158°.

When the above process is carried out and 5-methyl-5-nitro-2-(4-chlorophenyl)-1,3-dioxane, 5-methyl-5-nitro-2-(3,4-dichlorophenyl)-1,3-dioxane, 5-methyl-5-nitro-2-(4-tolyl)-1,3-dioxane, 5-methyl-5-nitro-2-(4-methoxyphenyl)-1,3-dioxane, 5-methyl-5-nitro-2-(3,4-methylenedioxyphenyl)-1,3-dioxane, 5-hydroxymethyl-5-nitro-2-phenyl-1,3-dioxane, or 5-ethyl-5-nitro-2-phenyl-1,3-dioxane is used in place of 5-methyl-5nitro-2-phenyl-1,3-dioxane, there is obtained 5-hydroxyamino-5-methyl-2-(4-chlorophenyl)-1,3-dioxane, (m.p. 144°–146° C.), 5-hydroxyamino-5-methyl-2-(3,4-dichlorophenyl)-1,3-dioxane (m.p. 131°–133° C.), 5-hydroxyamino-5-methyl-2-(4-tolyl)-1,3-dioxane (m.p. 148°–150° C.), 5-hydroxyamino-X5-methyl-2(4-methoxyphenyl)-1,3-dioxane, 5-hydroxyamino-5-methyl-2(3,4-methylenedioxyphenyl)-1,3-dioxane, 5-hydroxyamino-5-hydroxymethyl-2-phenyl-1,3-dioxane, or 5-hydroxy-amino-5-ethyl-2-phenyl-1,3-dioxane, respectively.

EXAMPLE 2

5-HYDROXYAMINO-5-METHYL-2-(4'-PYRIDYL)-1,3-DIOXANE.

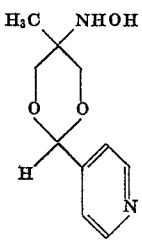

4

Step 1: 5-methyl-5-nitro-2(4'-pyridyl)-1,3-dioxane.

A mixture of 2-nitro-2-methyl-1,3-propanediol (130 g. 0.96 mole), 4-pyridinecarboxaldehyde (103 g. 1.27 mole), p-toluenesulfonic acid monohydrate (205 g. 1.08 mole), and benzene (1,000 ml.) is placed in a flask equipped with a Dean-Stark water separator. The mixture is stirred and refluxed until a water phase (33 ml.) fails to separate in the condensate. The reaction flask is then placed on a rotary evaporator and the solvent is removed in vacuo. The residue is cooled in ice and treated with 50 percent sodium hydroxide until basic to litmus. The caustic layer is extracted four times with chloroform. The chloroform layer is washed with water, dried with sodium sulfate, filtered, and then concentrated in vacuo on a rotary evaporator. Chromatography of the resulting material on a silica gel column (chloroform lluant) gives a product which, upon crystallization from a methylene chloride-ether-pentane mixture gives 5-methyl-5-nitro-2-(4'-pyridyl)-1,3-dioxane; m.p. 102°–104° C.

Step 2: 5-hydroxyamino-5-methyl-2-(4'-pyridyl)-1,3-dioxane (11.2 g. 0.05 mole), 5 percent platinum on carbon (0.60 g.), and isopropyl alcohol (150 ml.) is hydrogenated at room temperature and 50 p.s.i. initial pressure. After 48 hours the reaction is terminated. The catalyst is filtered off and the filtrate concentrated in vacuo on a rotary evaporator. The residue is chromatographed on a silica gel column and, after developing with benzene and eluting with chloroform there is obtained 5-hydroxyamino-5-methyl-2-(4'-pyridyl)-1,3-dioxane; m.p. 166°–168° C.

When the above procedure is carried out and 5-methyl-5-nitro-2-(2'-furyl)-1,3-dioxane, 5-methyl-5-nitro-2-(2'-thienyl)-1,3dioxane, or 5-methyl-5-nitro-2-(3'-pyridyl)-1,3-dioxane is used in place of 5-methyl-5-nitro-2-(4'-pyridyl)-1,3-dioxane, there is obtained 5-hydroxyamino-5-methyl-2-(2'-furyl)-1,3-dioxane (m.p. 135°–138° C.), 5-hydroxyamino-5-methyl-2-(2'thienyl)-1,3-dioxane (m.p. 162°–164° C.), or 5-hydroxyamino-5-methyl-2-(3'-pyridyl)-1,3-dioxane, respectively.

What is claimed is:

1. A compound of the formula

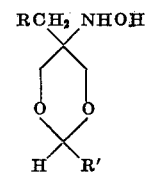

where R represents hydrogen, hydroxy or methyl and R' represents thienyl (2- or 3-)or a pharmacologically acceptable acid addition salt thereof.

2. a compound according to claim 1 wherein R represents hydrogen and R' is as defined in claim 1.

3. A compound according to claim 1 wherein R represents hydroxy and R' is as defined in claim 1.

4. A compound according to claim 1 wherein R represents methyl and R' is as defined in claim 1.

5. A compound according to claim 1 which is 5-hydroxyamino-5-methyl-2-(2'-thienyl)-1,3-dioxane or a pharmacologically acceptable acid addition salt thereof.

* * * * *